July 17, 1951      M. P. CHAPLIN      2,560,847
MOLDED FIBRE ARTICLE
Filed June 3, 1947      4 Sheets-Sheet 1
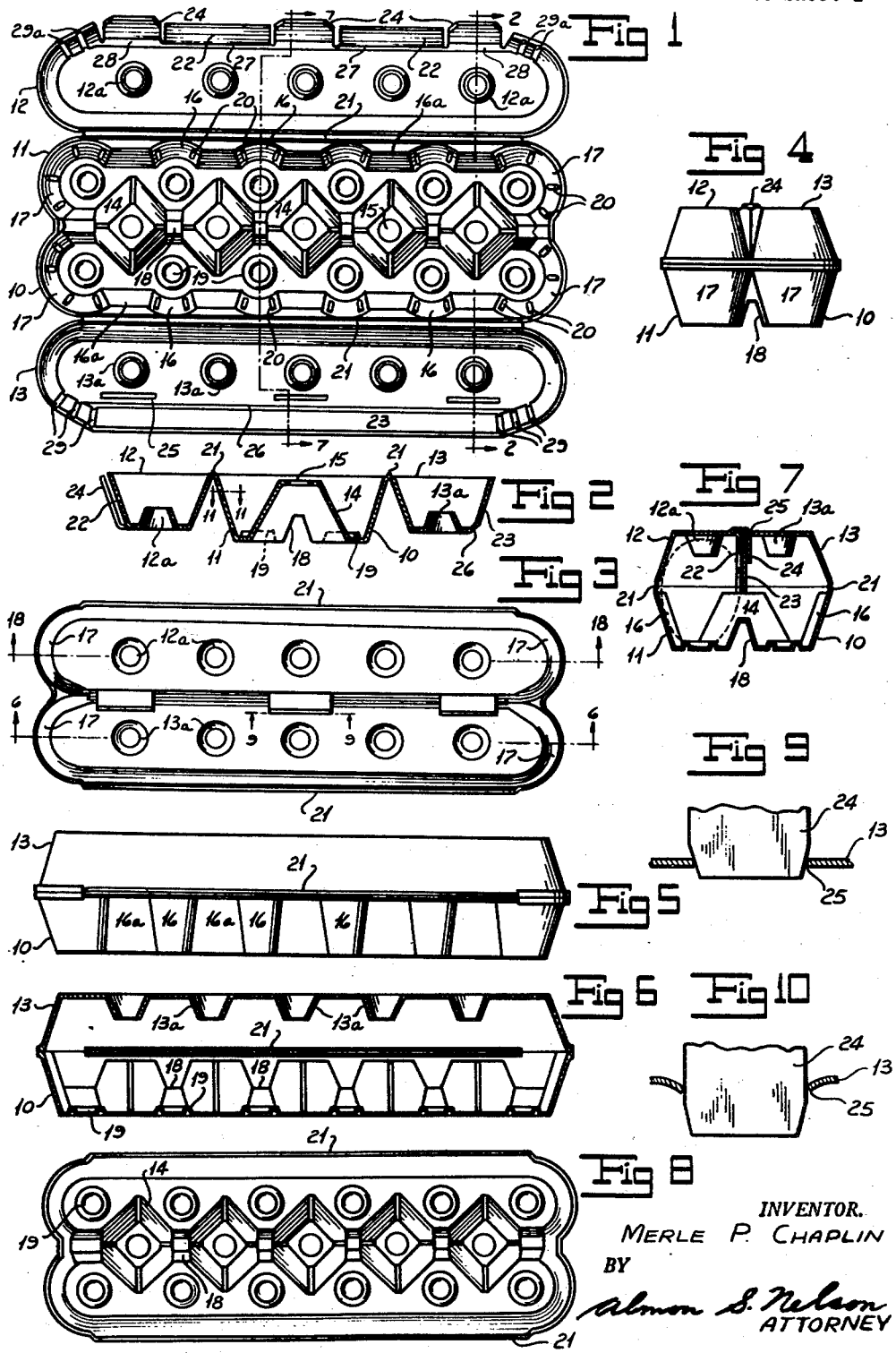
INVENTOR.
MERLE P. CHAPLIN
BY
Almon S. Nelson
ATTORNEY July 17, 1951 M. P. CHAPLIN 2,560,847
MOLDED FIBRE ARTICLE
Filed June 3, 1947 4 Sheets-Sheet 2
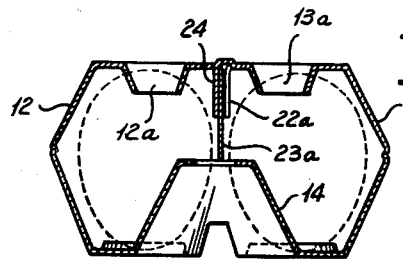
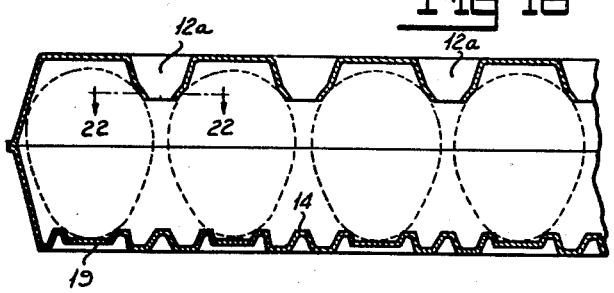
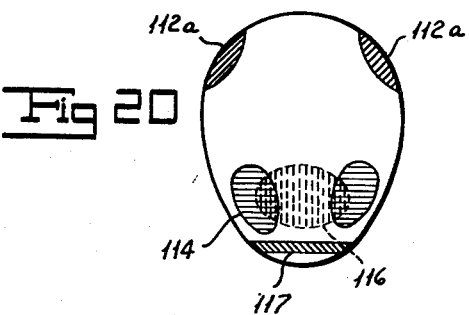
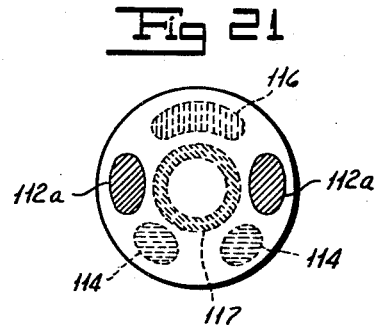
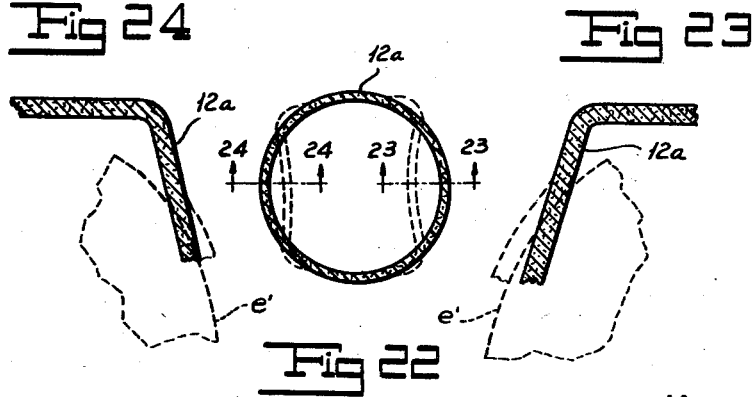
INVENTOR.
MERLE P. CHAPLIN
BY
Almon S. Nelson
ATTORNEY

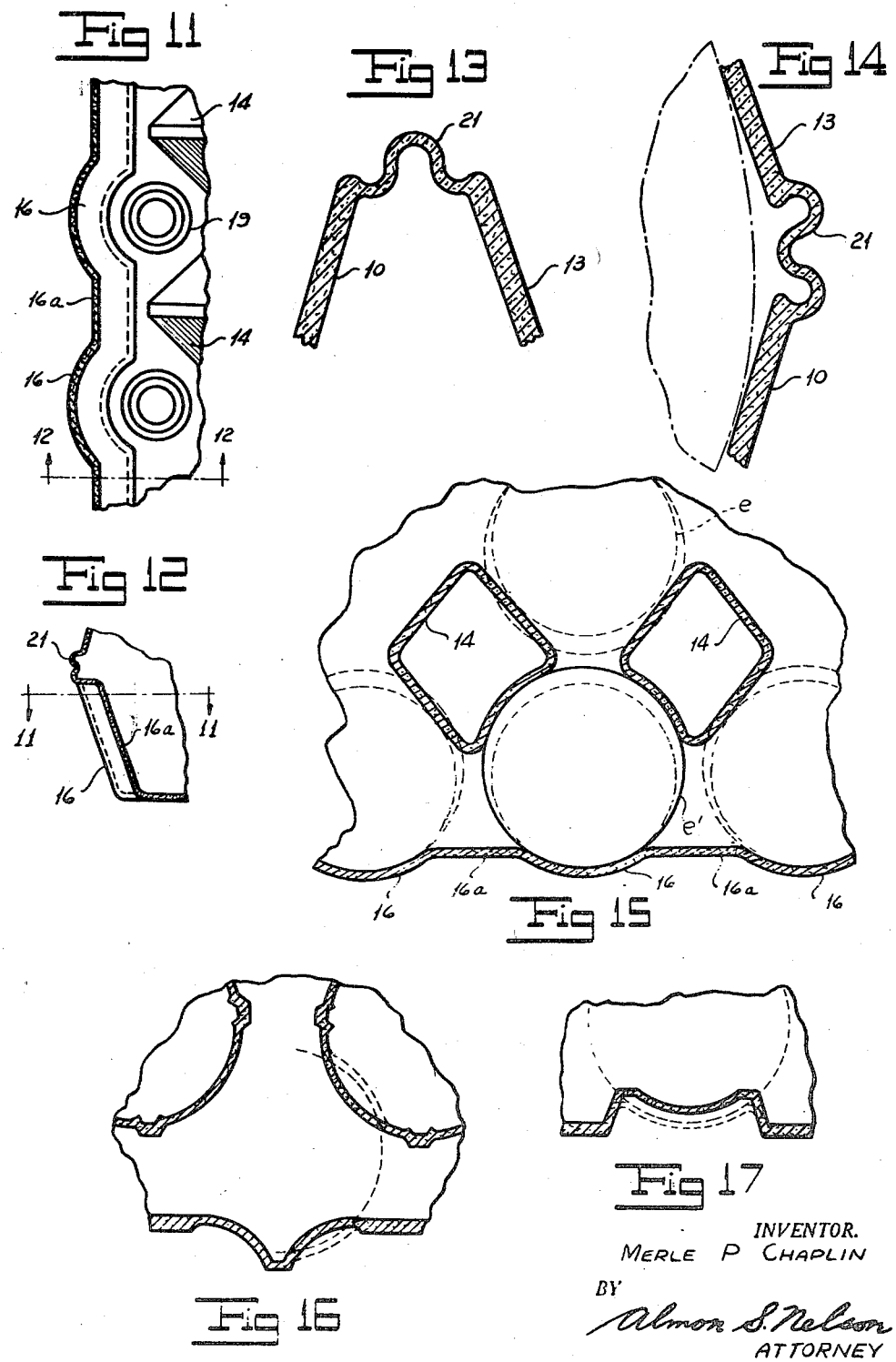

July 17, 1951  M. P. CHAPLIN  2,560,847
MOLDED FIBRE ARTICLE
Filed June 3, 1947  4 Sheets-Sheet 4
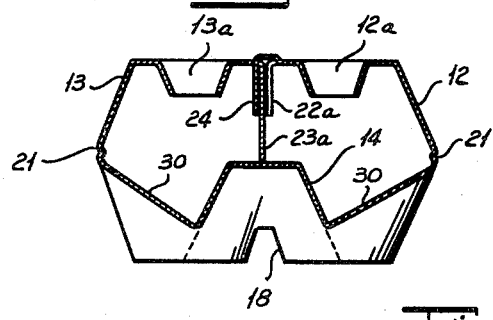
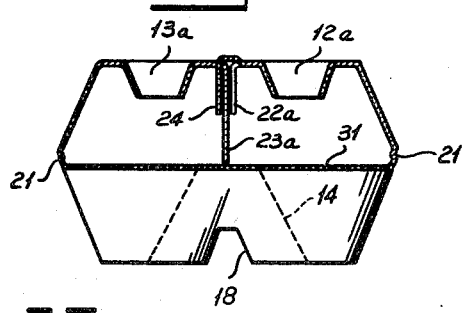
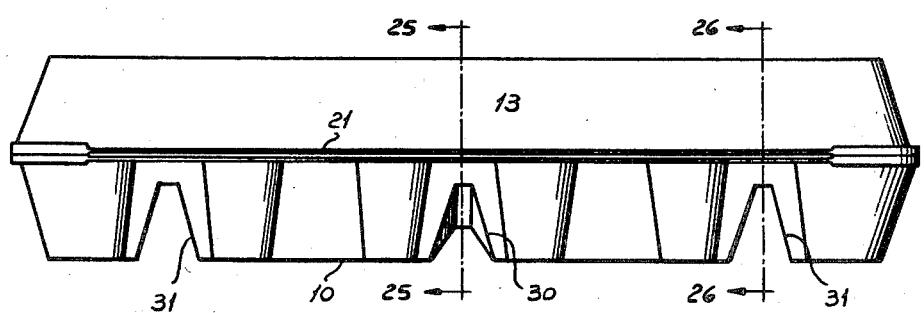
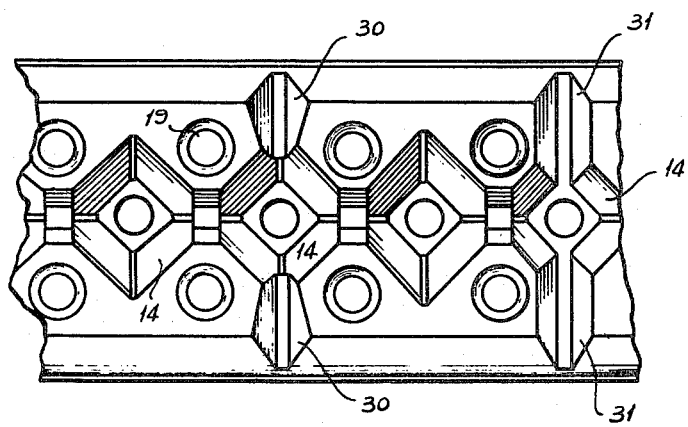
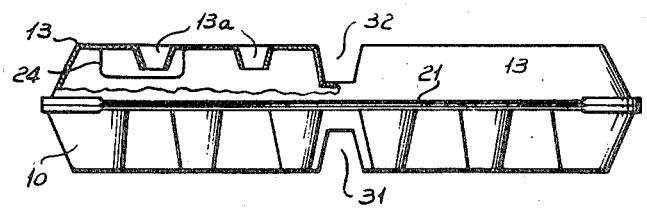
INVENTOR.
MERLE P. CHAPLIN
BY
Almon S. Nelson
ATTORNEY Patented July 17, 1951

2,560,847

UNITED STATES PATENT OFFICE 2,560,847

MOLDED FIBER ARTICLE

Merle P. Chaplin, South Portland, Maine, assignor to Chaplin Corporation, South Portland, Maine, a corporation of Maine Application June 3, 1947, Serial No. 752,187

8 Claims. (Cl. 229—2.5)

This application is a continuation-in-part of my application for "Molded Fibre Article," filed December 17, 1943, under Serial Number 514,684, which on July 8, 1947, matured into Letters Patent No. 2,423,756. That patent described with some particularity molded fibre egg cartons embodying the invention therein disclosed. The present invention is primarily directed to improvements in such egg cartons whereby they are adapted to more efficiently support eggs, particularly eggs of widely different sizes, and more effectually protect such eggs against breakage. There is also included in the appended claims features disclosed in the parent application but not claimed in the patent into which said application matured.

This invention relates to molded fibre cartons in general but is particularly adapted for incorporation in cartons for packing fragile objects such as eggs.

The accompanying drawings (herein referred to) illustrate a carton suitable for packing eggs in two rows of six eggs per row, or a total of one dozen eggs. This is known to the trade as the 2 x 6 carton. It is however, understood that the invention is not limited to a carton of this size or shape, nor is it limited exclusively to the packing of eggs.

By molded fibre carton is meant an article formed from a mixture of fibres and liquid on a contoured die, shaped to the approximate size and kind of object to be made. This is in contradistinction to an article for a similar purpose, but fabricated from flat sheet material.

Molding from liquid fibre mixtures enables shapes and forms to be produced not possible or practicable where flat sheet materials are employed. Preferably the article of this invention, after forming on suitably shaped dies, is dried between other heated dies to preserve the exact shape and form of the article, and to impart to its surface distinctive finishes.

One of the novel features herein initially disclosed consists in so constructing the carton that a portion of one of the cover walls may be omitted to provide a correspondingly greater article packing space in a carton of the same over-all dimensions.

Another feature consists in the provision of novel means for holding those portions of the eggs which extend into the cover sections.

A further feature consists in the incorporation into the carton of novel cross-bracing ribs to transversely reinforce the carton walls against exteriorly applied crushing strains or pressure against such walls.

Another feature consists in the provision of openings in the covers of the carton through which the size and condition of the eggs therein may be observed, without exposing any portion of the eggs to exterior damage.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

Figure 1 is a top plan view of the carton shown with its two part cover open.

Figure 2 is a transverse section taken on the line 2—2 of Figure 1, looking in the direction of the arrows.

Figure 3 is a top plan view of the carton with the covers closed.

Figure 4 is an end elevation of the carton with the covers closed.

Figure 5 is a side elevation of the carton shown with the covers closed.

Figure 6 is a vertical, longitudinal section on the line 6—6 of Figure 3, looking in the direction of the arrows.

Figure 7 is a cross section on the broken line 7—7 of Figure 1 and looking in the direction of the arrows, but showing the covers closed.

Figure 8 is a bottom view of a modified form of carton similar to that shown in Figure 1, but with the planular side walls in the bottom section.

Figure 9 is a somewhat enlarged fragmentary view, partly in section on the line 9—9 of Figure 3, illustrating a locking tab of one cover member entering a locking slot of the other cover member.

Figure 10 is a view similar to Figure 9, but showing the tab of one cover member locked in the slot of the other cover member.

Figure 11 is an enlarged plan section of the side wall of the lower pocket section of Figure 1, said section being taken on the line 11—11 of Figure 12.

Figure 12 is a fragmental section of the side wall structure on the line 12—12 of Figures 2 and 11.

Figure 13 is a section showing the hinge construction between the pocket and cover sections when the covers are open.

Figure 14 is a like section showing the position taken by the hinge section parts when the covers are closed.

Figure 15 is a greatly enlarged horizontal section through one of the article receiving areas of the pocket section, showing the flexure of the walls of the central supporting members for the article.

Figure 16 shows a modified structure of one of the article receiving areas of the pocket section wherein flexible sections are molded integrally with the rest of the structure to provide flexibility in the supporting areas of the article receiving cavity.

Figure 17 shows the structure of the bottom support for the article, where the article is supported on a special cushion member, forming an integral part of the whole molded fibre structure.

Figure 18 is a vertical longitudinal section on the line 18—18 of Figure 3.

Figure 19 is a transverse section in the plane of the line 2—2 of Figure 1, but showing the free edge wall of one cover section of less depth than the corresponding wall of the other cover section.

Figure 20 is a schematic view showing an egg in the position it occupies in one of the egg cavities. The shaded areas in this view indicate the areas where such egg is supported by contact with the carton.

Figure 21 is a like schematic view looking down upon the top of the egg.

Figure 22 is a fragmental section taken approximately in the horizontal plane of the line 22—22 of Figure 18, showing the manner in which the walls of one of the egg supports yields to support eggs of different sizes.

Figure 23 is a fragmental section on the line 23—23 of Figure 22.

Figure 24 is a like section on the line 24—24 of Figure 22.

Figure 25 is a transverse section on the line 25—25 of Figure 27.

Figure 26 is a like section on the line 26—26 of Figure 27.

Figure 27 is a side elevation of a closed carton of the general character shown in Figure 1, but provided with transverse stiffening and bracing ribs.

Figure 28 is a fragmental bottom view of the carton shown in Figure 27.

Figure 29 shows a modified construction in side elevation with a portion of one cover section in central section.

Containers or cartons for eggs, or other similar fragile objects, are customarily made by two generally distinct methods. One is a fabricated carton made from flat sheet board, and the other is a carton molded or formed to its desired shape by some pulp forming process of method.

The carton made or fabricated from board is limited in its design and construction, as board can be bent or formed in one direction only. It is not possible to secure shaped, curved, or other irregular surfaces from a sheet of board without destroying its strength.

In order to provide sufficient flexibility for the packaging of articles such as eggs, it is frequently necessary, in cartons made from board, to slit, cut, or otherwise weaken certain egg supporting areas in order to provide sufficient flexibility for the proper cushioning of the eggs.

In making cartons by a pulp molding or fibre molding process, many of the limitations of shape and contour necessary in a board carton are eliminated, for, within reasonable limits, it is possible to shape a molded article to fit or meet any desired contour or irregular shape.

Heretofore, in making cartons, for the packing of eggs and similar objects by a pulp molding process, it has been thought necessary to make the walls of the carton rather thick, heavy, and soft, in order to provide an adequate cushioning for the egg surfaces.

In order to impart to the article sufficient softness or cushioning qualities, it has been necessary to materially detract from its strength, rigidity, and sturdiness. Also the thickness and bulk of such a type of molded carton is high, and considerable packing space is required both to pack and ship cartons for use, and also considerable extra space is taken up by the pulp and this detracts from the useful egg packing space.

By methods and processes, not a part of this application, ways and means have been found to mold fibre objects to any desired shape and contour and still have them strong and rigid, and their surfaces comparable in smoothness and texture with the smoothest of board or similar materials, which have been well calendered or finished in sheet form. This at once removes two of the objections of soft bulky molded articles, in that high strength factors are obtained and the surface is smooth, attractive, and can be printed in colors or decorated in any desired manner.

With the provision of these strength factors and surface finish to the article it is still necessary that adequate cushioning means be provided which will yield to cushion the eggs against shock, and will also yield to permit the packing of larger eggs, while still holding the smaller eggs against shaking around or vibration within the carton itself. These should be accomplished without slitting or otherwise weakening the strong smooth structure and, therefore, must be accomplished by features of design and construction of the carton itself.

Means must also be provided so that, when the carton is closed for shipment, after being filled with eggs, said cover or covers are securely locked in place, so that the carton cannot possibly come open accidentally, and allow the eggs to be exposed or spilled out. This locking means must hold the covers securely in place, be easily manipulated, and not require the use of any added device, such as a clip, string, or tape for securing the covers in closed position. Nevertheless, when it is desired to open the carton, to take out the eggs, it must be opened without difficulty, although it may necessitate the rupture of some part of the locking device, which, of course, serves as an indication that the carton has been opened and is useful in preventing tampering with eggs while in storage.

One additional feature of this particular carton, as shown, is that its outside size is such that it may be packed in the standard egg crate used for packing eggs in bulk, where thirty dozen eggs are packed, fifteen dozen in each end or section of the crate, in five layers with three dozen eggs on each layer. In such a standard bulk packing, adjacent eggs are separated only by a relatively thin cardboard separator or filler, and it consequently follows that, when eggs are packed in dozen cartons, there must be a minimum of space between cartons, or eggs in adjacent cartons in order that the cartons themselves can be packed in the standard case without wasting space.

This feature and limitation as to carton size, makes it absolutely necessary to reduce the thickness or bulk of the carton as much as possible, and to utilize all of the available space inside the carton for the eggs themselves, while still maintaining the eggs out of contact with each other, and also protect them from all reasonable shocks from the outside of the carton itself.

Referring to the several figures of the drawings herein before enumerated, Figure 1 shows the carton viewed from the top with its two cover members open and the carton in position to receive a dozen eggs.

The carton itself consists of a bottom or egg containing section, shown generally at 10 and 11, with cover sections 12 and 13. These two cover sections are connected by means of specially molded integral hinges to the opposite sides of the egg receiving portions 10 and 11, these hinges being shown generally at 21. The side walls of the carton can be made generally straight or planular, as indicated in Figure 8, but preferably I make them in a pilastrade, or a series of pilasters, in order to give the side walls stiffness, rigidity, and strength, and also to provide, in part, the egg or article receiving cavities. These pilastrated side wall structures are joined at their ends by two curved sections 17, which form the end of the carton, and also form, in part, egg receiving cavities. The side walls consist generally of the pilaster portions 16 (see Figures 1, 11 and 12) and the intermediate portions 16a. Each curved end section 17 of the carton forms, in effect, an end pilaster, and, at the same time, a connecting member to the center of the carton where it joins a second member 17, which ties in with the opposite carton wall.

Referring particularly to Figures 11 and 12, it will be observed that the wall section on each long side of the carton is greatly increased in strength over and above what would be obtained if a single flat straight wall was employed, as shown in Figure 8. The bending moment of the wall is, in effect, the distance between the outermost portions of the wall 16 and 16a, as shown in Figure 12, in contradistinction to the mere thickness of the stock of the side wall were a planular single straight wall employed as is shown in Figure 8. To space the eggs from each other both lengthwise and crosswise in the carton, there is arranged through the center of the carton a plurality of flat sided compartment forming knobs shown as pyramids 14. Five such pyramids are shown and they are positioned with the axial planes of their converging edges arranged longitudinally and transversely of the carton. One side of each pyramid forms one of the cavity defining walls for the egg or other article.

These pyramids 14 are made with long flat sides molded and finished to have strength and rigidity in a vertical direction for supporting purposes, but flexible between their converging edges to permit yielding when eggs of different sizes are inserted in the carton. Referring more particularly to Figure 15, which is a sectional view looking down on the carton and through the approximate center of the area which supports the eggs, it will be observed that each egg, on one side, is supported within the curved area of one of the side wall pilasters 16, while it is supported on its other side by a wide flat surface on two adjacent center members 14.

In this figure, the circles e and e' indicate eggs of small and large size. The dotted line circle shows the support of a small egg e, in that the egg is contacted on a plurality of sides, so that it is held from shaking around or moving within the carton, which is objectionable. The full line circle in this same Figure 15 illustrates what happens when a large egg e' is inserted in the carton, and shows how the long flat walls of the interior members 14 can flex to provide space for the larger egg while still insuring that the eggs opposite each other do not touch.

In other words, the eggs are always held toward the outside of the carton so that there is a maximum of space between adjacent eggs at all times. However, when large eggs are packed, which is a very necessary feature of all cartons in order that they may take and hold the largest eggs, they must necessarily come nearer to each other, and the center supports 14 permit this, while definitely assuring that they do not touch each other.

Figure 15 very clearly shows how the eggs are supported within the pocket or base section of the carton. In the parent case no means was provided on the cover sections for spacing the eggs apart and no such means is necessary if all the eggs are large or of average size. However, if some of the eggs are large and others are quite small, there is a tendency, particularly when the carton is inverted, for the smaller eggs to fall away from contact with the parts 16 and 14 and, in some instances, they may, during rough handling, contact with adjacent eggs in a direction longitudinally of the carton. This may cause breakage and, in order to eliminate this, there is formed on the cover sections 12 and 13 of the present improved carton internal projections 12a and 13a, respectively. These projections may be of any suitable shape, but are conveniently made of frustoconical form. They are molded into the cover sections in such position that they are arranged in longitudinally spaced relation, corresponding to the spacing of the projection 14 and along the medial lines of the cover sections. They project downwardly when the cover sections are closed and form, in effect, separators between eggs contained in the several egg compartments of the lower section.

Figures 22–24, inclusive, show the manner in which these separators function. When the smallest eggs are placed in the individual compartments, they will just about contact with the walls of adjacent separators, but if a larger egg is placed in any particular compartment, the contacting wall of the separator or separators will yield sufficient to accommodate such egg, as shown in dotted lines at the left hand side in Figure 22 and in Figure 24. If an egg of larger size is placed in such compartment, the wall of the separator will yield further, as shown in dotted lines in the right hand portion of Figure 22 and in Figure 23. In other words, eggs of normal or larger than normal size will deform the yieldable walls of the separators 12a and 13a sufficient to accommodate these eggs and hold them firmly in position in the respective egg cavities of the lower section. The use of these spacers has been found to be highly advantageous as the eggs are thereby precluded from rattling about in the package, even though they are not large enough to come into contact with these spacers. Such spacers, therefore, have a very definite advantage in the packaging of eggs of all sizes within a container of the character described.

For supporting the egg at the bottom, I may employ a soft pulp area in each of the egg receiving cavities, such as shown at 19 in Figures 6, 7 and 8, but I preferably employ an integral construction shown considerably enlarged in Figure 17. This structure is made a part of the carton in its integral molded fibre formation. It provides a supporting area over a substantial part of the bottom of the egg and accommodates itself to the shape of the egg, so that it can be pressed downwardly whenever long eggs are packed in the container which, when the cover is closed, requires extra space and necessitates that the bottom of the egg come closer to the bottom of the carton, as indicated by the dotted lines in Figure 17.

When eggs are supported in the manner stated, it will be apparent that each egg is effectually held against shifting. Figures 20 and 21 graphically show how this is so, for in these figures the shaded areas indicate actual surface contact with different parts of the carton. Thus the shaded areas 112a on diametrically opposite sides of the upper portion of the egg indicate surface contacts with the contiguous spacers 12a or 13a as the case may be. The shaded area 116 indicates the surface contact between the egg and the concave seat 16 with which it engages. The shaded areas 114 correspond to the surface contacts made between the egg and two adjacent pyramidal center members 14. The annular surface contact between the egg and the seat structure shown in Figure 17 is indicated in Figures 20 and 21 by the shaded area 117. Thus the egg is shown at rest with surface contact at its bottom, with a three point surface contact at its side above the bottom and at a two point surface contact in its upper portion, so that it is held in absolutely stable position by the corresponding parts of the carton. The holding of eggs in this manner by a multi-area support, arranged in the manner stated, is distinctly novel in egg cartons.

It has already been pointed out that the outside size of the carton is limited by the fact that it must be packed with other cartons in a certain definite space. In order to insure that there be the maximum space between the eggs in any carton, I pack the eggs against the pilastrated outside walls, or the cushions in these outside walls, and hold the eggs or other articles in their proper places between the pilastrated sections, as stated, by means of the flexible walls of the inner pyramidal structures. The outside walls are prevented from moving outwardly under the added pressure of eggs from the inside, both by reason of their structural design, and also because they are tied together at the top by means of the interlocking cover sections as presently described. As larger eggs are packed in the carton, the long flat walls of the pyramid sections will be flexed inwardly as shown in Figure 15, until the maximum size of egg has been reached, and all of the space inside the carton is thus utilized. Under this condition the eggs are individually held firmly between the two flexed walls of two adjacent pyramid sections, the recess between the pilasters in the outer walls and the spacers of the cover sections, thereby firmly retaining the egg in position, and preventing it from vibrating or shaking against or coming in contact with adjacent eggs.

In order that the eggs may be adequately protected from the outside, two methods may be used either in conjunction with each other, or one may be used alone. Referring particularly to Figure 14, this shows, considerably enlarged, the outside of the carton at the hinge line, or at the line of greatest egg diameter. It will be observed that the hinge structure here employed adequately protects the egg against shock from the outside, or from an egg in an adjacent carton, by providing a series of convolutions, yielding in their nature and located directly opposite the egg at its largest diameter. Another method which I may employe in order to further cushion eggs, particularly where it is desired to pack eggs having extra thin shells or where it is desired to handle them very carefully for incubating or other purposes is shown in Figure 16.

For this extra cushioning I may, in the side walls of the interior supporting members 14 or in the walls of the pilasters 16, provide cushion members which will serve as flexible cushions over the area which the eggs will contact, without detracting from the strength and supporting characteristics of the remainder of the carton.

Some similar, but not as effective means, may be had by providing thickened or soft sections at these points as is generally shown at 20, Figure 1. While these relatively soft sections provide a certain amount of cushioning, they do, however, have the objection of taking added space, particularly when the cartons are nested for shipment and, at the best, they do not provide as good a support, particularly so far as resiliency and flexibility is concerned, as do the structures shown in Figure 16.

For further stiffening of the carton lengthwise in addition to the pilaster structure of the side walls, I preferably connect the interior supporting members 14, by a series of hollow rib members 18, as shown in Figures 1 and 8. One of these connecting hollow rib members is shown in section in Figure 7.

Besides providing longitudinal strength, the rib sections 18, connecting the members 14, provide an air space beneath the carton, which can communicate with the interior of the carton by providing holes or openings 15 in the top of each one of the center members 14. The centers of the separators 12a and 13a are also preferably cut out to provide relatively large holes as shown and this, together with the openings 15 will provide ventilation within the carton insuring better refrigeration of eggs in storage.

Another advantage of making the separators 12a and 13a with open ends is that these relatively large openings permit the eggs to be viewed therethrough and their size and appearance ascertained without necessitating the opening of the carton and without exposing any part of the eggs during shipment.

The cover members 12 and 13 are connected to the upper portion of the pilastered side walls 16 and 16a by means of hinges 21, as already stated. The shape of the two cover portions is such that they will nest, when open, as in Figure 2, but when closed they will match evenly around the ends of the bottom section and close together, as shown in Figures 4 and 7.

The outer portions of the walls of the cover sections 12 and 13 are flared outwardly as indicated at 22 in cover section 12, and 23 of cover section 13. In order that they may swing inwardly from the flared or tapered position shown in Figure 2 to the locking position shown in Figure 7, a hinge is provided on cover portion 13 at 26 and on cover portion 12 at 27 and 28.

In addition to the hinge portion extending along the entire length of cover portion 13 at 26, there is provided at each end and adjacent to the hinge portion and the curved end portions, a plurality of connected hinged sections 29 to permit the flared portion of the cover 13 to swing inwardly about its hinge 26 from the flared position of Figure 2 to the more vertical position of Figure 7. When the flared portion 23 of the cover 13 swings inwardly, the hinges 29 flex and the several sections between them move to a nearer vertical position, permitting the portion 23 to assume a more vertical position and adjacent to the companion part on cover 12.

Similarly on cover 12 there are hinges provided between the portions 22, the locking tabs 24 and the main cover part 12. These hinges have been referred to as 27 and 28. Similarly, there are a plurality of hinges 29a in the tapered wall to permit the end sections on the side of the cover to bend inwardly from the flared position shown in Figure 2 to the more nearly vertical position shown in Figure 7.

For securing the two cover sections 12 and 13 in closed position, there is provided a plurality of locking tabs 24 in cover portion 12 and a similar number of locking slots 25 on cover portion 13. In closing the carton the central portions 22 of cover 12 contact the tapered portion 23 of cover 13, and both are pressed against each other, swinging each portion into the parallel vertical contacting relation indicated in Figure 7.

At the same time that the covers are closed together, locking tabs 24 are inserted in slots 25, and after the covers are completely closed they assume the position where they are locked together by the tabs as shown in Figure 7. It has already been pointed out that the several hinge areas 29 and 29a permit the flared portions, longitudinal or lengthwise of the cover portions, to bend inwardly into locked position.

In the structure of Figures 1–8, inclusive, the walls at the free edges of both cover sections, i. e., the walls 22 and 23, are of the full height of the cover sections, so that when the covers are in locked position, the free edge of the portion 23 of cover 13 rests directly on the tops of the central members 14, thereby providing a vertical support for the cover when other cartons of eggs are packed on top. Portions 22 of cover 12 similarly rest their edges on the tops of portions 14, forming an additional support for the cover sections 13 in addition to that afforded by the tabs which lock cover 13 to cover 12.

In the arrangement shown in Figure 7, there is thus provided between transversely positioned eggs a double wall thickness of the two cover sections. This takes up space, one-half of which I have found it possible to save my making the wall 22a on the cover section 13 of Figure 19 of less depth than the corresponding wall 22 of the structure of Figure 7. The wall 23a of the cover section 12 in Figure 19 is made for the full depth of the cover section, so that it seats on top of the several pyramidal projections 14 and supports the top of the cover section against caving in. The locking tabs 24 in Figure 19, when passed through the locking slots of the section 12, adequately support the top wall of the section 13 by imposing its weight upon the wall 13a. By this arrangement a little more space is left for eggs of larger diameter, so that they are not subjected to undue pressure at this point. This is accomplished while still providing a wall 23a between transversely adjacent eggs.

A further advantage of this construction is that it reduces a certain amount of materials used in the manufacture of the carton and also reduces the shipping weight of the carton.

It will be noted that the hinge areas 21 between the base sections 10 and 11, and the cover portions 12 and 13, are located somewhat above the center of the carton depth. This provides the widest area opposite the portion of the egg of greatest diameter which is somewhat above its center when the egg is packed small end downward as is customary. Figure 14 illustrates the position of the largest portion of the egg diameter relative to the hinge 21 and shows the protection afforded the bulge of the egg by the hinge structure itself. This is not only shown in Figure 14 considerably enlarged, but also in Figure 7 on a somewhat reduced scale from actual carton size.

It will also be noted that the tops of portions 14 are located somewhat below the hinge line of the carton, so that when portions 23 and 22 contact each other and are pushed all the way down to the top of parts 14, they will be somewhat below their hinge center, and therefore, have a tendency to go farther due to the natural springiness of the hinge portion between parts of the two covers. If desired, however, the pyramidal parts 14 may extend upwardly to the plane of the hinge sections.

For locking the tabs 24 in slots 25, the width of the slot is made somewhat less than the width of the tabs as is indicated in Figure 9. When the tab is pushed all the way into the slot, the edges of the slot 25 bend downwardly, as indicated in Figure 10, and thereby lock the tabs in position at both edges. This prevents the carton from opening accidentally and securely locks the cover portions of the carton together until it is desired to open them to remove the eggs.

In Figures 25–28, inclusive, I have shown a novel method of transversely reinforcing the carton by the formation within the lower section thereof of transversely extending ribs. One or more of these transverse ribs may be provided, as desired, and they may be alike or of different construction.

In Figure 27, the carton is reinforced by incorporating therein three such ribs, the central rib 30 of which is of somewhat different formation than the other two ribs 31. The rib 30 is for substantially the full depth of the lower section of the carton at the opposite sides of said section, but tapers in depth to the point where it merges into the corresponding pyramidal portion 14, as clearly shown in Figures 25 and 27. The rib 31 on the other hand is of substantially uniform height approximately equal to that of the depth of the lower section, although it may be lower if desired, and it extends from the outer side wall uniformly throughout the width of the lower carton section and merges into the wall of the corresponding pyramidal portion 14, as shown clearly in Figures 25, 27 and 28. These ribs in either form act as struts against laterally applied crushing pressures or impact and materially reinforce the carton in the direction of its width.

Figure 29 shows a construction wherein a 2 x 6 carton is provided midway of the length of the compartment section 10, with a transverse rib 31 like that shown in Figure 25, and both of the cover sections 12 and 13 are also provided with alined transverse ribs 32 located directly above the rib 31. Ribbed structures thus arranged in both the bottom and cover sections provide a reduced cross sectional area to permit the carton to be cut into halves where the customer wishes to purchase only a half a dozen eggs, instead of the full dozen which the standard carton holds.

It will thus be seen that I have provided a simple molded fibre structure, which has incorporated in itself, a considerable number of novel features necessary to the proper packing of articles such as eggs. As already stated, I preferably finish my molded fibre article between heated dies both to retain the article in exact size and shape and also to provide its surfaces with a smooth, attractive finish not possible where the ordinary pulp molding methods of molding are employed and the carton oven dried, or by similar drying methods.

I also provide an outer wall structure, pilastrated in form, and made firm and rigid, eliminating all flexibility or yielding which might result in the eggs being broken or injured by contact from the outside. Where it seems necessary, I may provide over certain areas of these outside rigid walls, cushioning members. Preferably, however, I provide the cushioning means in the center areas of the carton, as has already been described, in order that its outside walls may be left firm and rigid to properly protect the eggs against damage by contact either with other cartons, or with the walls of the packing case.

Generally speaking, the eggs are held in position against the outer or pilastrated walls, or against cushions in these walls, the pyramid sections through the center of the carton yielding as much as is necessary in order to provide for the different sizes of eggs. The ultimate yielding, of course, provides space to fill the entire central area of the carton with eggs, so that eggs crosswise the carton and adjacent to each other, may be fairly close together, but definitely separated by the springy action of the long flat walls in the pyramid sections themselves.

By providing hinge sections as here shown, I protect the egg or row of eggs at the point of the greatest diameter by a corrugated member running the entire length of the carton and opposite all of the eggs in the outside rows, this assuring that the eggs, at their largest and most exposed area, are further protected in addition to any cushion member which may be located in the carton wall itself.

By providing transverse ribs, I get a stronger carton than heretofore possible, while the separators and the cover insure proper spacing of the smallest eggs while holding average and large size eggs to firm seats against the contacting parts of the lower section of the carton and by making these separators with open ends, more efficient circulation and refrigeration is accomplished in addition to the provision of means for inspection of the eggs without opening the carton.

The foregoing detailed description sets forth the invention in its preferred practical forms, but the invention is to be understood as clearly commensurate with the appended claims.

Having thus fully described the invention, what I claim as new and desire to secure by Letters Patent is:

1. A molded fibre carton for eggs and the like comprising: two sections of substantially the same height pivoted to one another and one of which constitutes a compartment section and the other a cover section, compartment knobs extending upwardly from the bottom of the compartment section for substantially the full depth of that section and forming compartments for eggs therein, there being formed on the interior of the cover section, at either side of the compartment knobs and in transversely alined relation thereto, depending yieldable tubular projections open at both ends and of materially less depth than the depth of the cover section.

2. A molded fibre carton for eggs and the like comprising: a carton body having a bottom provided between outer side walls with a row of extending compartment forming knobs, the upper ends of which constitute cover supporting abutments, and integral covers hinged to the upper edges of the opposite side walls of the body, one of said covers having a flange at its free edge substantially equal to the depth of such cover and having in said cover locking slots and the other cover having a flange at its free edge of lesser depth than the depth of such cover and provided with locking tongues adapted, when said flanges of the two covers are facially engaged with one another with the deeper flange of the two resting on said abutments, to enter into the locking slots and lock the covers together.

3. A molded fibre carton for eggs and the like comprising: integral compartment and cover sections hinged to one another, the compartment section having a row of compartment knobs extending upwardly from the bottom thereof and forming the interior of said section into a series of compartments adapted to individually contain parallel rows of eggs between the compartment knobs and the opposite sides of the compartment section, the cover section being formed on its interior with integral depending tubular projections arranged in rows one of which coincides with each row of eggs with the projections of each row positioned between the points of nearest proximity of the eggs of the corresponding row, said tubular projections being open at both ends to render the depending walls of said tubular projections yieldable and readily conformable with eggs of different sizes, and the depth of said projections being of materially less depth than the compartment section.

4. A molded fibre carton for eggs and the like comprising: integral compartment and cover sections hinged to one another with parallel rows of seats in the compartment section to support parallel rows of eggs therein in spaced relation both longitudinally and transversely of said section, a plurality of rows of yieldable tubular projections integral with the cover section, there being as many rows of such projections as there are rows of seats in the compartment section, and the yieldable tubular projections of each row extending downwardly between the eggs of the corresponding row when the cover is closed with the axes of the projections of each row of projections lying in a plane longitudinally of the compartment section and passing through the axes of all of the eggs of the corresponding row, said tubular projections being open at both ends to render the depending walls of said tubular projections yieldable and readily conformable with eggs of different sizes, and the depth of said projections being of materially less depth than the compartment section.

5. A molded fibre carton for eggs and the like comprising: integral compartment and cover sections hinged to one another with seats in the compartment section to bear against and support eggs in spaced apart relation, and tubular frustoconical separators integral with and projecting downwardly from the top wall of the cover section to extend between and into engagement with eggs in the seats of the compartment section when the cover is closed, the lower ends of said tubular separators being open to render the depending walls of said separators yieldable and readily conformable with eggs of different sizes.

6. A molded fibre carton for eggs and the like comprising: integral compartment and cover sections hinged to one another with seats in the compartment section to bear against and support eggs in spaced apart relation, and frustoconical separators integral with and projecting downwardly from the top wall of the cover section into engagement with eggs in the seats of the compartment section when the cover is closed, the upper ends of said tubular separators being open and there held in shape by said top wall and the lower ends of said tubular separators being open to render the depending walls of said separators yieldable and readily conformable with eggs of different sizes.

7. A molded fibre carton for eggs and the like comprising: a body having side walls and a bottom and at least one cover pivoted to the upper edge of a side wall and foldable over the body to close the open top thereof, said side walls having formed therein longitudinally spaced apart internally concave seats for surface engagement with eggs contacting therewith, the bottom having upwardly projecting knobs spaced from the side walls and staggered with respect to said concave seats and having surface engagement with such eggs, and said cover having tubular frustoconical separators extending downwardly between the eggs and open at their lower ends to render the depending walls of said separators yieldable and readily conformable with eggs of different sizes.

8. A molded fibre carton for eggs and the like comprising: a carton body having a bottom provided between outer side walls with a row of extending compartment forming knobs, the upper ends of which constitute cover supporting abutments, and integral covers hinged to the upper edges of the opposite side walls of the body, both of said covers having flanges at their free edges with at least one of said flanges of a depth substantially equal to the depth of such cover and adapted to rest upon the upper ends of said supporting abutments when the covers are closed with the flanges in facial engagement with one another, one cover having locking slots arranged longitudinally of such cover contiguous to the flange thereof and the other cover having locking tongues to enter into said slots to lock the covers together in closed positions.

MERLE P. CHAPLIN.

REFERENCES CITED

The following references are of record in the file of this patent:

UNITED STATES PATENTS

| Number | Name | Date |
| --- | --- | --- |
| 1,681,700 | Folmer | Aug. 21, 1928 |
| 1,846,561 | Koppelman | Feb. 23, 1932 |
| 2,009,874 | Cauley | July 30, 1935 |
| 2,061,064 | De Reamer | Nov. 17, 1936 |
| 2,088,603 | Kronenberger | Aug. 3, 1937 |
| 2,100,516 | Read | Nov. 30, 1937 |
| 2,160,893 | Newsom | June 6, 1939 |
| 2,285,129 | Schwartzberg | June 2, 1942 |
| 2,423,756 | Chaplin | July 8, 1947 |
| 2,446,264 | Cox | Aug. 3, 1948 |
| 2,455,295 | Cox | Nov. 3, 1948 |
| 2,466,579 | Cox | Apr. 5, 1949 |